Sept. 22, 1970  F. H. BACHOFEN  3,530,303
CURRENT ZERO ANTICIPATING CIRCUIT
Filed April 1, 1969  2 Sheets-Sheet 1
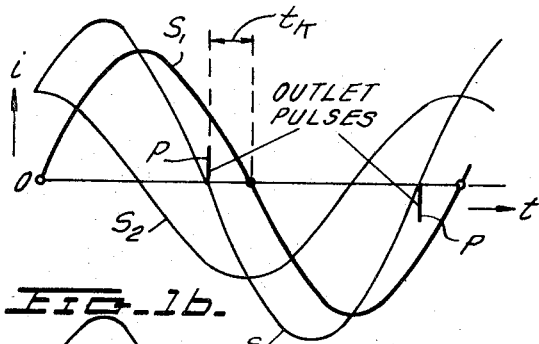
FIG. 1a.
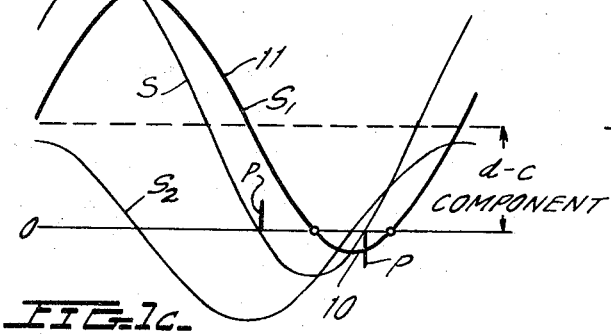
FIG. 1b.
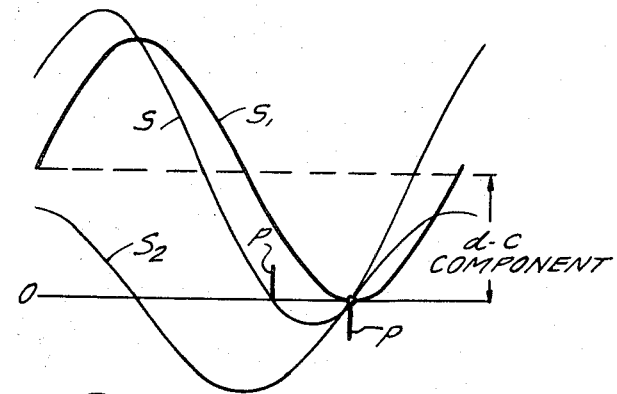
FIG. 1c.
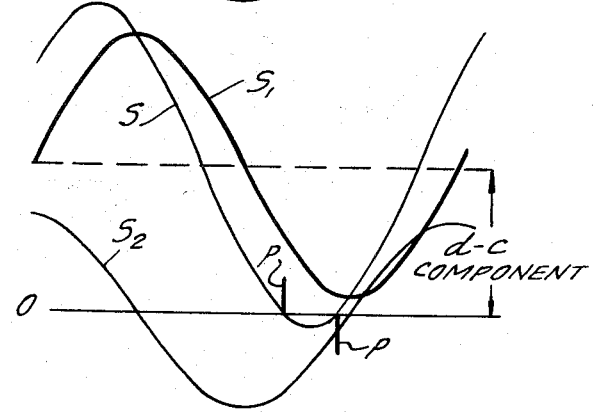
FIG. 1d.
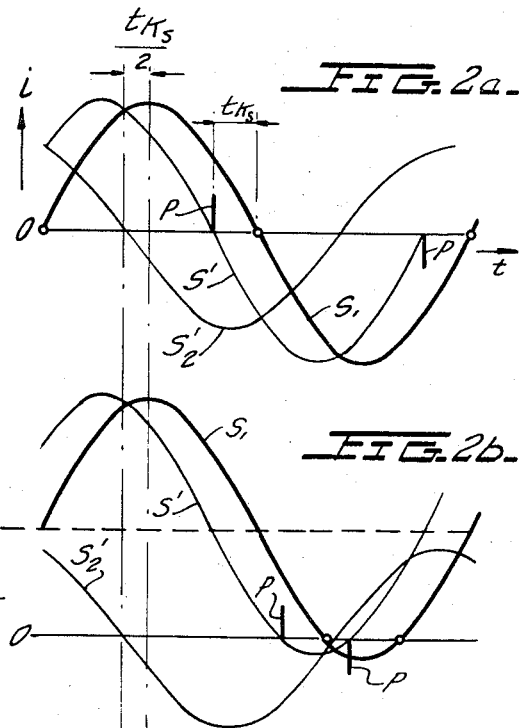
FIG. 2a.
FIG. 2b.
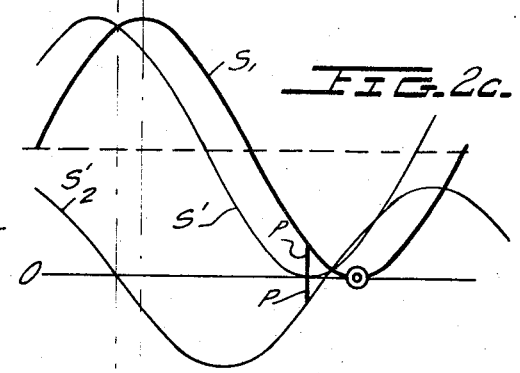
FIG. 2c.
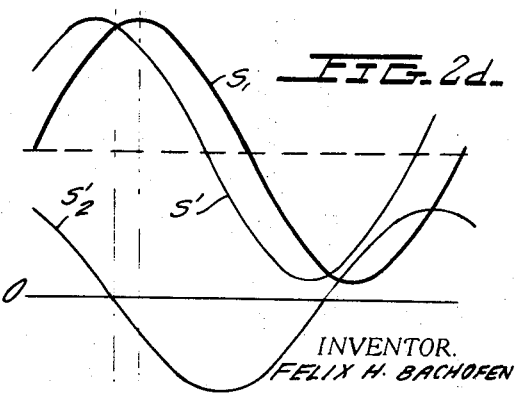
FIG. 2d.
INVENTOR.
FELIX H. BACHOFEN
BY
OSTROLENK, FABER, GERB & SOFFEN
ATTORNEYS Sept. 22, 1970   F. H. BACHOFEN   3,530,303
CURRENT ZERO ANTICIPATING CIRCUIT
Filed April 1, 1969   2 Sheets-Sheet 2
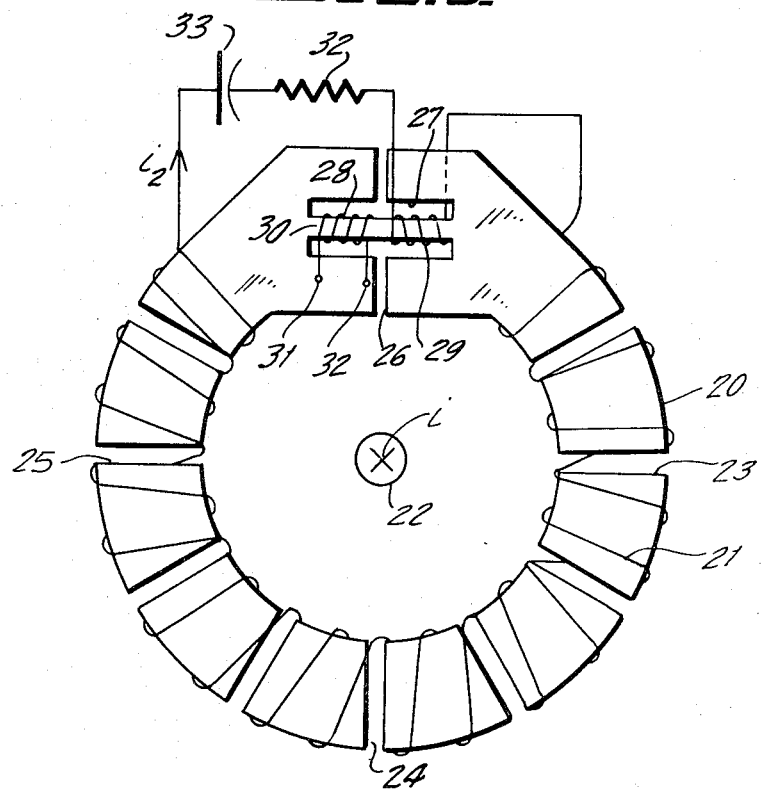
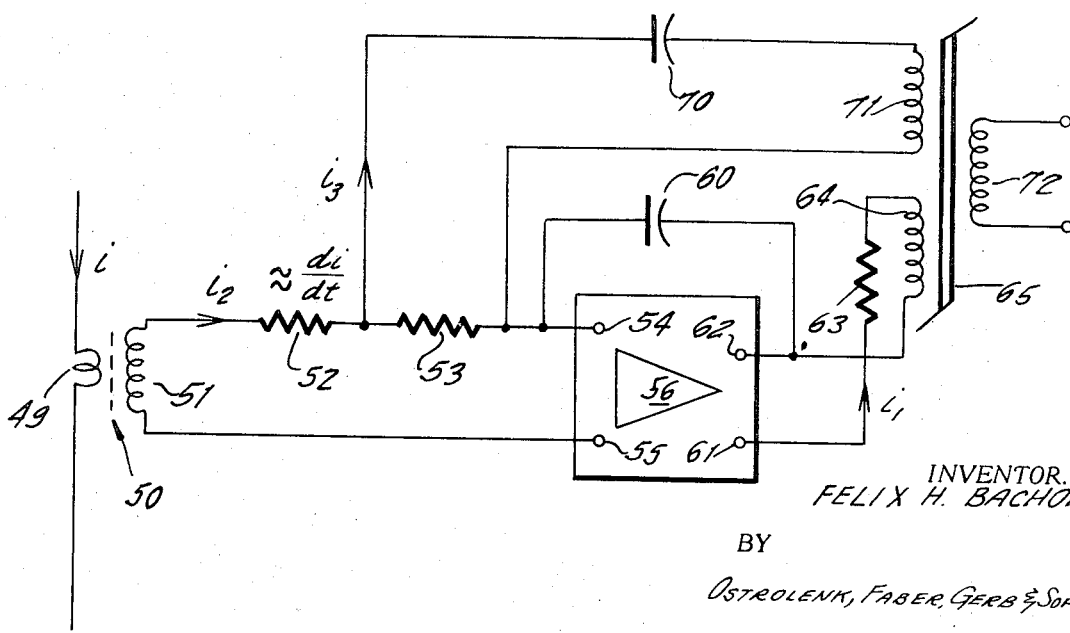
INVENTOR.
FELIX H. BACHOFEN
BY
OSTROLENK, FABER, GERB & SOFFEN
ATTORNEYS United States Patent Office 3,530,303
Patented Sept. 22, 1970

3,530,303
CURRENT ZERO ANTICIPATING CIRCUIT
Felix H. Bachofen, Folcroft, Pa., assignor to I-T-E Imperial Corporation, Philadelphia, Pa., a corporation of Delaware
Filed Apr. 1, 1969, Ser. No. 811,815
Int. Cl. H01h 9/56
U.S. Cl. 307—106            9 Claims

ABSTRACT OF THE DISCLOSURE

A circuit for generating a signal pulse at a given time before the current zero value of a symmetric or asymmetric current. The pulse is obtained by adding the outputs of two circuits, one of which is proportional to the current of the circuit being measured, and the other being proportional to the sum of the derivative of the current being measured and the time delay that would normally be produced.

---

This invention relates to a zero current anticipating circuit, and more particularly relates to a signal generating circuit for generating a pulse at a given time prior to the passage through zero of the current being monitored, whether the current monitored is symmetric or asymmetric.

Circuits of this general type are well known, and as shown, for example, in the patent to Kesselring, 3,388,361, or the patent to Nitta et al., 3,315,169. This type circuit has particular value for the operation of synchronous circuit interrupters, or circuit interrupters in which the contacts separate just prior to a current zero value. Thus, a circuit is needed to initiate operation of the interrupter mechanism, and this circuit must be capable of operating at some fixed time prior to current zero.

The circuit of Pat. 3,388,361 operates by creating a first signal proportional to current and a second signal proportional to the derivative of the current, and then adding these two signals. The total signal, when the current is a pure sine wave, will have a wave shape which leads the shape of the current being monitored by a given angle, depending on the relative magnitudes of the two derived signals which were added to one another. Any suitable circuit is relative magnitudes of the two derived signals which were added to one another. Any suitable circuit is then used to generate a pulse when the total signal passes through zero, this occurring at some given time before the current being monitored passes through zero. Thus, a zero current anticipator is provided.

While this circuit is suitable when used for symmetric A-C currents, when the current monitored is asymmetric, the signal output pulse will appear at a fixed time before current zero, and a pulse will be generated if the current wave shape reverses without going through zero. Thus, the time between the pulse generation and actual current zero is longer when preceding a minor loop and shorter when preceding a major loop. Thus, if a circuit interrupter is in a circuit which must interrupt an asymmetric fault current, the pulse timing will be incorrect and the interrupter may open after the passage of a current zero or too early before passage of current zero. Moreover, if the asymmetric current reverses without going through current zero, the circuit will still generate an opening signal to the interrupter. Since synchronous interrupters are designed to interrupt current first before a current zero, the foregoing conditions could damage the interrupter (and the circuit protected thereby).

In accordance with the present invention, a novel anticipator circuit is provided which generates a pulse at a fixed time before current zero, even though the monitored current is asymmetric, and does not generate a pulse if the asymmetric current does not pass through zero. In particular, the circuit produces and adds two signals, one proportional to the current being monitored, and the other proportional to the derivative of this current shifted by a time equal to one-half the time delay that ordinarily would be produced between the output pulse and the current zero. The totaled signal is then used to produce an output pulse. In this manner, the actual time delay between output pulse and current zero is held constant, even for asymmetric currents, and no signal is produced if the asymmetric current does not pass through zero.

Accordingly, a primary object of this invention is to provide a current zero anticipating circuit which produces an output signal a fixed time prior to a current zero, even on asymmetric currents.

Another object of the invention is to produce an output signal a fixed time before current zero of a symmetric or asymmetric current, and to suppress such an output signal if an asymmetric current reverses without passing through zero current.

These and other objects of this invention will become apparent from the following description and drawings in which:

FIGS. 1a to 1d show the signal outputs of prior art-type current zero anticipator circuits for a symmetric current and for various asymmetric current conditions.

FIGS. 2a to 2d are similar to FIGS. 1a to 1d, respectively, and illustrate the operation of the present invention.

FIG. 3 shows a first embodiment of the present invention using a magnetic circuit for adding the various current signals.

FIG. 4 shows a second embodiment of the invention in which the signals are electronically processed.

Referring first to FIGS. 1a to 1d, there is shown the operation of a circuit of the type used in the patent to Kesselring, 3,388,361, the disclosure of which is incorporated herein by reference. The structure shown in that patent monitors a current in an A-C circuit and produces two signals from the monitored current. The first is a signal $S_1$, which is proportional to the circuit current, and the second is the signal $S_2$ which is proportional to the derivative, with respect to time, of the circuit current. The two signals are then added together to give a resulting signal S. The resulting signal S is then connected to a suitable circuit for producing an output pulse P when signal S passes through zero. In FIG. 1a, the circuit current monitored is a symmetric sine wave as shown by curve $S_1$. In this situation, the resulting signal S will pass through zero at a fixed time $t_k$ before signal $S_1$ passes through zero. This time $t_k$ can be fixed by fixing the relative magnitudes of signals $S_1$ and $S_2$.

However, if, as shown in FIG. 1b, the current being monitored is asymmetric, and has a D-C component, the time $t_k$ preceding minor loop 10 enlarges, and the time $t_k$ preceding major loop 11 shortens. Therefore, pulses P are no longer generated at a known time prior to the next current zero.

As the D-C component increases, the situation worsens, as shown in FIG. 1c. Finally, if the D-C component is so large that the monitored current does not pass through zero, the circuit can still generate false pulses which could cause a synchronous circuit breaker to attempt operation on relatively high instantaneous currents.

As will be seen later and shown in FIGS. 2a to 2d, the circuit of the invention causes a fixed pulse advance time, regardless of the symmetry of the current being monitored (FIGS. 2a to 2c), and pulses are not generated if a current zero is not reached (FIG. 2d).

FIG. 3 shows an embodiment of the invention which is a modification of the structure shown in Kesselring Pat. 3,388,361. In Fig. 3, a magnetic core 20, which may be of laminated transformer steel receives a winding 21. The current conductor 22, carrying the current to be monitored, passes through the center of core 20. Core 20 is provided with air-gaps 23, 24 and 25 which prevent saturation of core 20 at the highest possible instantaneous current $i$ which could be conducted in conductor 22.

A further air gap 26 is formed in core 20 and a cavity 27 extends into the pole faces formed by gap 26. A small area bridge 28 of saturable magnetic material extends across cavity 27. Bridge 28 may be formed of laminations of material which exhibit a square hysteresis loop so that, when its magnetic flux reverses, a sharp voltage pulse can be induced in a winding on bridge 28. Bridge 28 then carries two windings, 29 and 30, where winding 30 has output terminals 31 and 32 at which suitably timed output pulse P of FIGS. 2a and 2d will appear.

Winding 21 is then connected in series with winding 29, and, in accordance with the invention, with a resistor 32 and capacitor 33. The values of resistor 32 and capacitor 33 are selected to produce a phase shift in the current $i_2$ flowing in the series circuit which equals $-\omega t_k/2$ where $\omega/2\pi$ is the frequency of current $i$ and $t_k$ is the desired time difference between the production of a pulse P at terminals 31 and 32 and the subsequent passage of current $i$ through zero.

In operation, the current $i$ induces a changing flux in core 20 which is essentially unaffected by the presence of bridge 28 in view of the relatively small cross-section of bridge 28 compared to the cross-section of core 20 and air gap 26. This changing flux is also conducted through bridge 28 and forms the signal $S_1$ of FIGS. 1a to 1d and 2a to 2d which is proportional to the current $i$.

The changing flux of core 20 also induces a voltage in winding 21 which causes current $i_2$ to flow in its series circuit and through winding 29. By properly selecting the numbers of turns of windings 21 and 29, the amplitude of the magnetic potential applied to bridge 28 by winding 29 can be made $$2 \sin \omega \frac{t_K}{2}$$

times the amplitude of the magnetic potential applied to the bridge by the current $i$. Therefore, the magnetic potential applied to bridge 28 by winding 29, and current $i_2$ represent the signal $S'_2$ of FIGS. 2a to 2d. The total magnetic potential of bridge 28 will be the signal $S'$ of FIGS. 2a to 2d, which goes through zero at a fixed time $t_k$ before every zero of the current $i$, whether this current is symmetric (FIG. 2a) or asymmetric (FIGS. 2b and 2c). Note that where the current $i$ does not pass through zero (FIG. 2d), the signal $S'$ does not go through zero, so that a pulse is not generated in winding 30.

FIG. 4 shows an electronic circuit for carrying out the present invention. In FIG. 4, the current $i$ to be monitored is carried through the primary winding 49 of transformed 50. The voltage on secondary winding 51 is proportional to $di/dt$. Winding 51 is connected in series with resistors 52 and 53 and the input terminals 54 and 55 of operational amplifier 56. The resistance of resistor 53 is much smaller than the resistance of resistor 52. For example, resistor 52 is 120K ohms while resistor 53 is 4K ohms. The input voltage of operational amplifier 56 is made negligble compared to the voltage drop on resistor 52 so that the burden on current transformer 50 is virtually the pure resistance of resistor 52. Therefore, secondary current $i_2$ is proportional to the secondary voltage of winding 51 and do $di/dt$.

Operational amplifier 56 is provided with a feedback capacitor 60. The output current $i_1$ from terminals 61 and 62 of amplifier 56 is connected in series with resistor 63 and winding 64 which is wound on a saturable core 65. The current $i_1$ will be proportional to current $i$ since operational amplifier 56 and its feedback capacitor 60 integrates the current $i_2$. Thus, the magnetic potential applied to core 65 represents signal $S_1$ of FIGS. 2a to 2d.

A circuit is then connected across resistor 53 which includes capacitor 70 and winding 71 on core 65. Current $i_3$ flows in this circuit. Current $i_3$ leads current by the time $t_K/2$, depending on the value of capacitor 70— typically 2.1 microfarads—which gives a lead time of .8 millisecond with resistor 53.

This current applies a magnetic potential to core 65 representing the signal $S_2'$ of FIGS. 2a to 2d. As the sum of the magnetic potentials applied to core 65 goes through zero, a rapid flux change occurs in core 65 and generates a voltage pulse P in its output winding 72, as shown in FIGS. 2a to 2d.

Although this invention has been described with respect to particular embodiments, it should be understood that many variations and modifications will now be obvious to those skilled in the art, and, therefore, the scope of this invention is limited not by the specific disclosure herein, but only by the appended claims.

The embodiments of the invention in which an exclusive privilege or property is claimed are defined as follows:

1. A zero current anticipating circuit for generating a signal at a fixed time prior to the occurrence of a current zero in an electrical circuit comprising, in combination:
   first means connected to said electrical circuit for generating a first signal proportional to the instantaneous current of said electric circuit;
   second means connected to said electrical circuit for generating a second signal proportional to the derivative with respect to time of said instantaneous current of said electrical circuit;
   third means for phase shifting said second signal by a given lead angle;
   a fourth means for adding said first and second signals together to form a third signal, whereby said third signal passes through a zero value at a fixed time prior to the passage of said instantaneous current through zero;
   and signal means connected to said fourth means for generating an output signal when said third signal passes through zero.

2. The zero current anticipating circuit of claim 1 wherein said given lead angle is approximately one-half the time difference that would exist between current zero of said instantaneous current and said output signal of said signal means when said third means is eliminated and when said current of said electrical circuit is a symmetric sine wave.

3. The zero current anticipating circuit of claim 1 wherein said signal means generates output pulses of fixed advance angle prior to a current zero of an asymmetric current in said electrical circuit wherein no pulse is generated when an asymmetric current in said circuit reverses without passing through a zero current value.

4. The zero current anticipating circuit of claim 1 wherein said fourth means includes a saturable magnetic core having first winding means carrying said first and second signals and an output pulse winding for delivering an output pulse when the flux of said core reverses.

5. The zero current anticipating circuit of claim 1 wherein said third means comprises a capacitor.

6. The zero current anticipating circuit of claim 1 wherein said first means comprises a magnetic core magnetically coupled to said electrical circuit and having a gap therein, whereby the magnetic potential across said gap is proportional to the instantaneous current of said electrical circuit; and wherein said second means comprises a winding on said magnetic core, and a second winding disposed in said air gap and connected in series with said first winding, whereby the magnetic potential of said second winding is proportional to the derivative of said instantaneous current of said electrical circuit; and wherein said third means comprises a capacitor connected in series with said second winding.

7. The zero current anticipating circuit of claim 1 wherein said second circuit means comprises a current transformer coupled to said electrical circuit and having an output circuit including a resistor, the current flow in said resistor comprising the derivative of the instantaneous current of said electrical circuit; and wherein said first circuit means comprises an operational amplifier having input and output terminals; said current flow in said resistor connected to said input terminals of said operational amplifier; said operational amplifier integrating the signal applied to the input terminals thereof and delivering a signal proportional to said instantaneous current at its said output terminals; said third means comprising a capacitor connected across said resistor; said fourth means comprising a saturable reactor core having winding means connected to said output terminals of said operational amplifier, and connected in series with said capacitor and resistor.

8. The zero current anticipating circuit of claim 6 wherein said fourth means comprises a second magnetic core disposed in said air gap; said second winding wound on said second magnetic core; and wherein said signal means comprises an output winding wound on said second magnetic core.

9. The zero current anticipating circuit of claim 7 wherein said signal means comprises an output winding wound on said saturable core.

References Cited

UNITED STATES PATENTS

| | | | |
|---|---|---|---|
| 3,313,982 | 4/1967 | Sequin | 307—133 X |
| 3,315,169 | 4/1967 | Yolshio Nitta et al. | 328—150 |
| 3,388,361 | 6/1968 | Kesselring | 307—133 X |
| 3,449,537 | 6/1969 | Kesselring. | |

ROBERT K. SCHAEFER, Primary Examiner

T. B. JOIKE, Assistant Examiner

U.S. Cl. X.R.

307—133; 317—11; 335—19